Aug. 4, 1925.
W. C. LOUD
1,548,203
AUTOMOBILE CURTAIN CONSTRUCTION
Filed Dec. 1, 1924 2 Sheets-Sheet 1
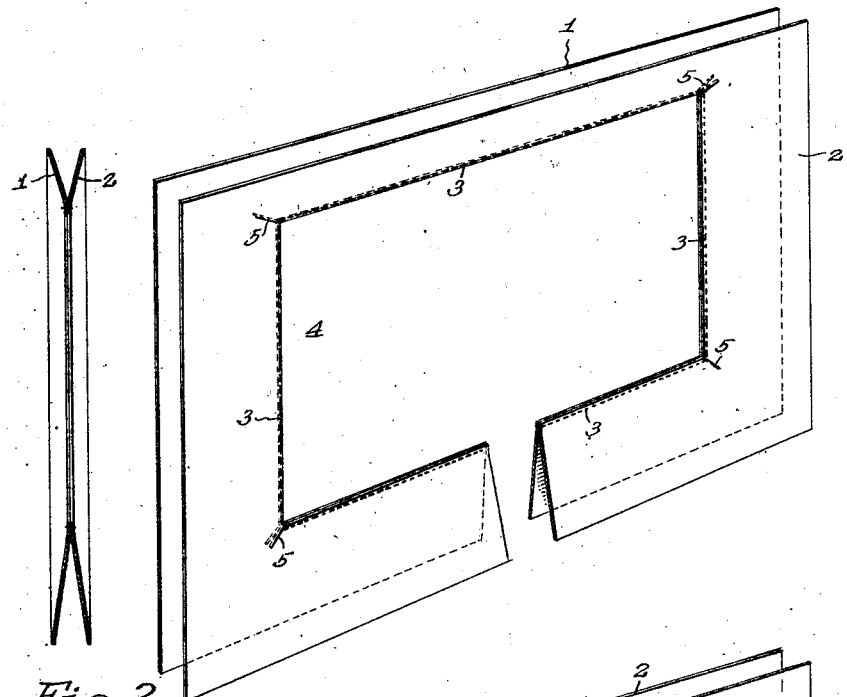
Fig. 1.
Fig. 2.
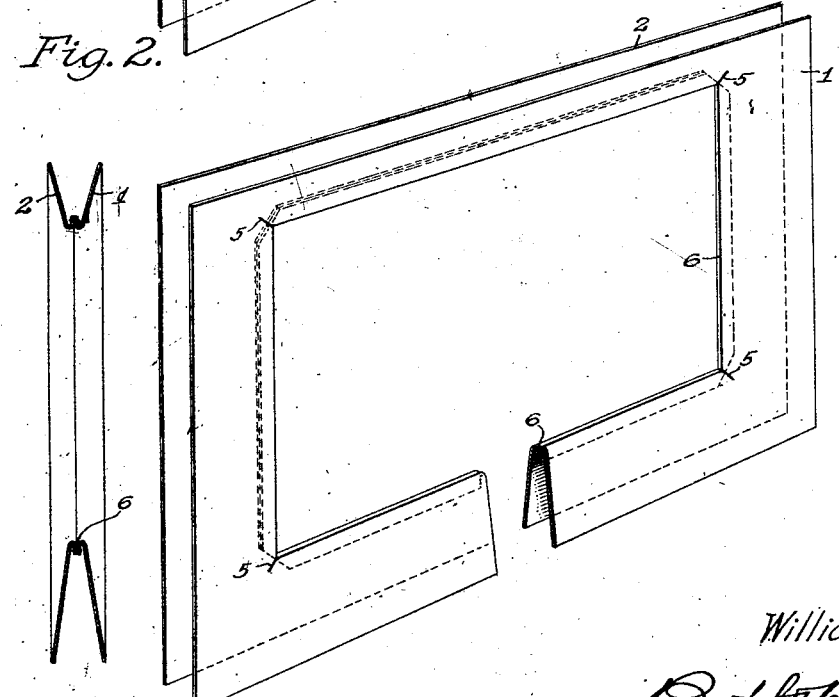
Fig. 3.
Fig. 4.
Inventor
William C. Loud,
By
Attorneys Aug. 4, 1925.
W. C. LOUD
AUTOMOBILE CURTAIN CONSTRUCTION
Filed Dec. 1, 1924  2 Sheets-Sheet 2
1,548,203
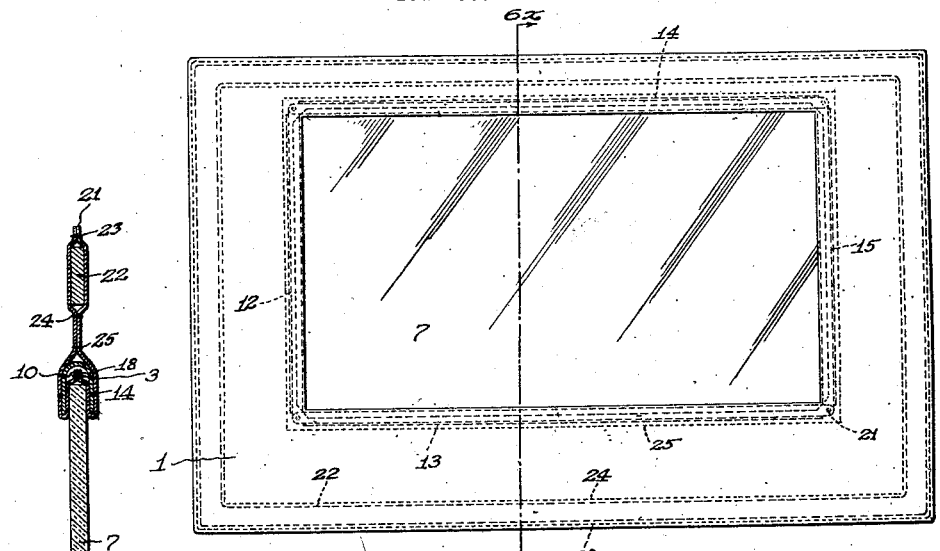
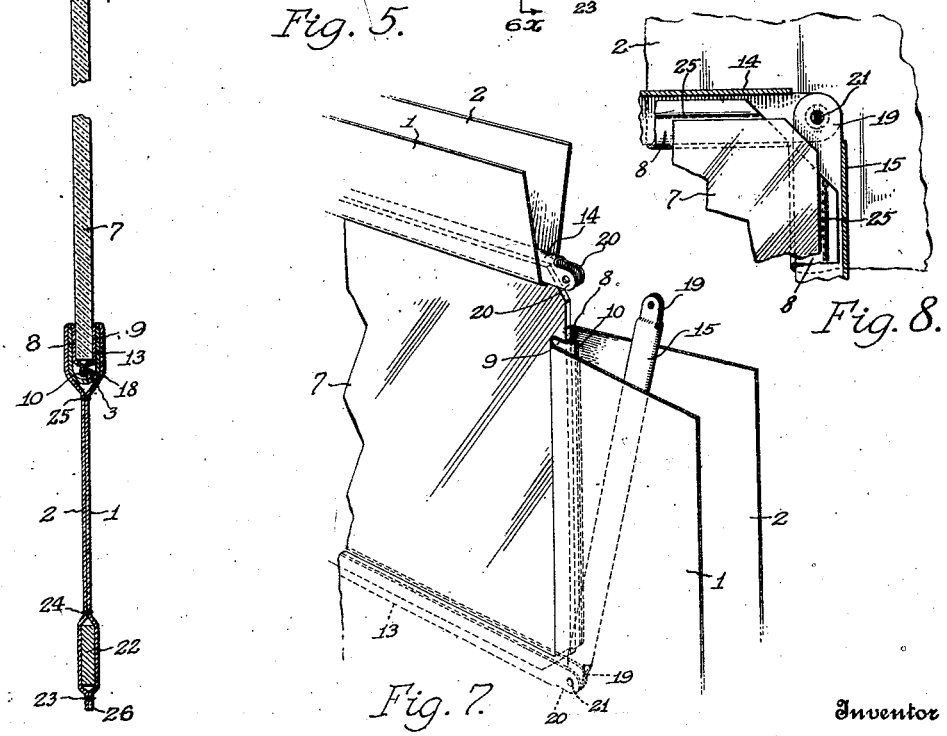
Inventor
William C. Loud,
By
Attorneys Patented Aug. 4, 1925.

1,548,203

UNITED STATES PATENT OFFICE.

WILLIAM C. LOUD, OF DETROIT, MICHIGAN, ASSIGNOR TO GLASSMOBILE COMPANY, OF DETROIT, MICHIGAN, A CORPORATION OF MICHIGAN.

AUTOMOBILE CURTAIN CONSTRUCTION.

Application filed December 1, 1924. Serial No. 753,129.

*To all whom it may concern:*

Be it known that I, WILLIAM C. LOUD, a citizen of the United States, residing at Detroit, in the county of Wayne and State of Michigan, have invented certain new and useful Improvements in Automobile Curtain Constructions, of which the following is a specification, reference being had therein to the accompanying drawings.

This invention relates to side curtain construction such as of the type referred to in my co-pending application, Serial No. 753,128 filed December 1, 1924, wherein a glass window is supported in a side curtain within a more or less rigid reinforcing frame by the fabric or material of the curtains entering said reinforcing frame and being secured around the edges of the glass in such manner that the supporting of the glass is effected within the said reinforcing frame by the fabric or material of the curtains; and has for its object the devising of an efficient and facile method of constructing and assembling a curtain in order to effect the mounting of the glass window in a curtain in the required manner.

A further object is to provide for the building up of a curtain by the stitching, cutting and folding of a pair of sheets of fabric, leather or similar material whereby they will be specially adapted for the reception and support of a glass window and for the application thereto of a reinforcing frame locking the fabric and glass in their respective relative arrangement; a still further object being to provide for the application to and between the two layers of fabric after the fitting thereto of a glass window of a hingedly articulated channel frame which may be wrapped around the glass engaging portions of the fabric and secured in reinforcing relation thereto.

Still further objects subsidiary to or resulting from the aforesaid objects, or from the construction or operation of the invention as it may be carried into effect, will become apparent as the said invention is hereinafter further disclosed.

In carrying the said invention into effect, I may stitch, cut or fold a pair of sheets of material and mount a glass and frames therein in the manner more particularly described and ascertained hereinafter, by way of example, having reference to the accompanying drawings, wherein Figure 1 is a perspective view of a pair of sheets of material after the initial sewing and cutting operations have been performed thereon, part of the same being cut away to more clearly indicate the relationship of the said sheets;

Figure 2 is a transverse section of the same;

Figure 3 is a similar view to Figure 1, illustrating the relationship of the sheets after the folding operation;

Figure 4 is a transverse section of the same after such folding operation;

Figure 5 is an elevation of a complete curtain;

Figure 6 is a transverse section taken on the line $6^x$—$6^x$ of Figure 5, partly broken away and drawn to a larger scale.

Figure 7 is a fragmentary detail broken view, illustrating in perspective the method of applying the reinforcing channel frame to the fabric enclosed edges of the glass; and Figure 8 is a fragmentary sectional detail view illustrating the corner arrangement of the reinforcing channel frame, enclosed fabric glass support, and glass.

Similar characters of reference indicate similar parts in the several figures of the drawings.

The method about to be described is intended to produce a curtain more particularly applicable to automobiles wherein a glass window will be supported by the fabric of the curtain within a channel reinforcing frame located around the margins of the said glass window but protectively isolated therefrom by the material of the curtain; and to produce such a curtain, I propose to take two pieces of fabric 1 and 2 of a desirable size and sew them together by stitching 3 extended along lines agreeing with the shape of the glass which is to be incorporated in the curtain, which in the example is considered as being rectangular, the dimensions of the space enclosed by the said stitching being somewhat less than that of the glass to be applied to the curtain. The fabric enclosed by the stitching is then cut out close thereto, to form an opening 4, after which the two sheets of the said fabric are angularly cut or notched outwardly from the corners of the said opening as at 5, the structure then being in the form illustrated in Figures 1 and 2.

The said fabric is now folded or reversed by passing one of the sheets thereof through the opening which brings the faces of the two sheets which were previously opposed to one another to the outside of the curtain, and causes the stitched marginal portions of the curtain contiguous to the opening to be folded within the two sheets of material as indicated in Figure 3, thereby forming a groove or recess 6 around the opening in the curtain, which recess is adapted to receive the peripheral edges of a glass window 7, the material forming the walls 8 and 9 of the groove 6 giving way sufficiently to properly admit such edges of the glass whereby they are substantially enclosed by such material, with the stitched portion 10 extending therearound.

Following the insertion of the glass window in the manner described and to secure it against undesired removal from the groove 6, I next reinforce the material enclosing the marginal portions of the glass by applying thereto an articulated channel frame, the internal dimensions at the base of the channel members of which are substantially greater than the external dimensions of the said glass, the said frame comprising members 12, 13, 14 and 15 hingedly joined together and adapted to extend along the respective edges of the said glass to embrace the fabric or similar walls 8 and 9 of the groove 6 and to accommodate the stitched edges 10 of the said fabric or material in the manner very clearly illustrated in Figure 6, the said stitched edges being located in the space 18 provided in the bed of the channel frame by reason of its superior dimensions over those of the glass. The hinged articulated nature of the said channel frame permits of it being virtually wrapped around the glass enclosing portions of the fabric or material, the method being quite clearly illustrated in the fragmentary view, Figure 7, which indicates the last applied side or section 15 of the frame about to be closed upon the fabric associated therewith, so that the perforated end 19 thereof will be entered between the correspondingly perforated and bifurcated end 20 of its adjacent section 14 after which it may be secured by a rivet 21 as shown in Figure 8.

The glass on all corners is preferably cut away to give freedom for the means attaching the sections of the frame together and the notching of the fabric, or material as at 5, similarly provides for clearance at the corners of the frame when the fabric is reversed, as will be apparent from an examination of the drawings.

The outer edges 26 of the fabric are, in the present example, extended or stretched over a frame 22 and secured by stitching 23 and 24, the fabric being further stitched together at 25 around the channel frame, the nature of the outer frame or even the existence thereof being governed by the type of curtain to which the glass window is applied, as it is quite obvious that the channel frame may itself form the outer frame of the curtain, the important features so far as the securing of the fabric or material exterior to the said channel frame being to provide for resistance to the entry of the fabric or material into the channel frame to an undesirable extent which would permit looseness of the glass within the frame or undue resting of the glass in the bed of the frame instead of the supporting of the said glass by the fabric or material in the manner hereinbefore explained.

It will be quite apparent that the stitching 25 or the securing of the fabric to the outer frames 22 or both of these factors will limit the extent to which the inner marginal portions of the said fabric may enter the channel frame, and where tension in the fabric is provided the tendency of the inner marginal portions thereof to be withdrawn from the channel frame will result in and effect the centralizing of the glass window within the said channel frame and thus assist in bringing about the suspension of the said glass window; but it should be understood that this tension is not absolutely necessary, particularly in small curtains having small windows, in which case only such tension may be provided as may be deemed necessary for the prevention of wrinkling of the fabric or undue flaccidity of the curtain.

The described manner of constructing a curtain and supporting a glass window therein lends itself readily to the commercial production of automobile or similar enclosures, admitting of speedy manufacture and assembling with efficiency in the supporting of the glass window when so assembled, and by the supporting of a window in the manner described, a protection is afforded for the same much greater than that which usually obtains in window supports, whereby the application of glass windows to meet conditions ordinarily unfavorable to the use of a fragile material such as glass is rendered feasible where otherwise it has not been ordinarily considered safe from breakage.

Herein the window is described as being supported within the reinforcing frame by the fabric and in further explanation of such expression it is pointed out that this is intended to have no limiting relevance to the disposition or support of the channel frame in the curtain as it will be understood that the channel frame may be considered as supporting the window through the medium of the inwardly folded fabric or material, but on the other hand, where the said channel frame is substantially free of any other frame such as the frame 22 as in the illustrated example, both the channel frame and the window might reasonably be considered as being supported by the fabric or material from the means upon which the said material is in itself mounted.

This invention may be developed within the scope of the following claims without departing from the essential features of the said invention, and it is desired that the specification and drawings be read as merely illustrative and not in a limiting sense, except as necessitated by the prior art.

What I claim is:—

1. The method of mounting a glass window which consists in sewing a pair of superimposed sheets of flexible material closely around a window opening therein, slitting the material at the corners of said opening, reversing the material whereby the sewn parts are folded inwardly therebetween forming a glass receiving groove, inserting the margins of a glass window into the groove so formed, and binding the inwardly folded material into engagement with the said margins.

2. The method of mounting a glass window, which consists in sewing a pair of superimposed sheets of flexible material closely around a window opening therein, slitting the material at the corners of said opening, reversing the material whereby the sewn parts are folded inwardly therebetween forming a glass receiving groove, inserting the margins of a glass window of larger size than the resulting opening into the groove so formed whereby the inward folding of the material is increased, reinforcing the folded material to bind it into engagement with said window, and sewing said sheets of material together about said reinforcement.

3. The method of mounting a glass window which consists in sewing a pair of superimposed sheets of flexible material closely around a window opening therein, slitting the material at the corners of said opening, reversing the material whereby the sewn parts are folded inwardly therebetween forming a glass receiving groove, inserting the margins of a glass window into the groove so formed, whereby it is held, embracing the inwardly folded material with a channel frame, and securing said sheets together about said channel frame.

4. The method of mounting a glass window which consists in sewing a pair of superimposed sheets of flexible material closely around a window opening therein, slitting the material at the corners of said opening, reversing the material whereby the sewn parts are folded inwardly therebetween forming a glass receiving groove, inserting the margins of a glass window of required size into the groove so formed, folding a hinged articulated channel frame around the inwardly folded material whereby the ends of said frame are brought together and the channel embraces said folded material, and securing the ends of said frame together.

5. The method of mounting a window according to claim 4, wherein the sheets are sewn together around said frame after the securing of the ends of said frame.

6. The method of mounting a glass window which consists in the utilizing of a pair of superimposed sheets of flexible material sewn closely about a window opening therein, slitting the material at the corners of the opening, reversing the material whereby the sewn portions are folded inwardly therebetween forming a flexible channel for the reception of the margins of a window, the slits expanding into openings at the corners of said flexible channel, inserting a glass window into the said folded portions with the corner portions thereof extending into said openings, and binding the said folded portions of the material into engagement therewith by means of an articulated channel frame whereby the said folded portions are embraced, and the hinged joints of said articulated frame brought into juxtaposition with the openings provided by the slitting of said material.

7. The method of mounting a glass window which consists in reversing a pair of superimposed sheets of material sewn together about a window opening therein and slit at the corners of said opening, whereby an inwardly folded flexible channel is provided about said opening, inserting the margins of a glass window into said flexible channel, stiffening said flexible channel by the application thereto of an embracing reinforcing channel frame located between the said sheets of material in such manner that the perimeter of said glass window is substantially spaced from the bed of said channel frame, and securing said material against further entrance into said channel frame.

In testimony whereof I affix my signature in presence of two witnesses.

WILLIAM C. LOUD.

Witnesses:
G. E. McGrann,
S. Lightfoot.